United States Patent
Deshpande et al.

(10) Patent No.: US 8,195,889 B2
(45) Date of Patent: Jun. 5, 2012

(54) HYBRID REGION CAM FOR REGION PREFETCHER AND METHODS THEREOF

(75) Inventors: Mahadev S. Deshpande, Fort Collins, CO (US); Ronny L. Arnold, Fort Collins, CO (US); Paul L. Rogers, Fort Collins, CO (US); Douglas R. Williams, Mountain View, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 367 days.

(21) Appl. No.: 12/410,891

(22) Filed: Mar. 25, 2009

(65) Prior Publication Data

US 2010/0250842 A1 Sep. 30, 2010

(51) Int. Cl.
*G06F 12/08* (2006.01)
(52) U.S. Cl. ............................ 711/137; 711/3
(58) Field of Classification Search .................... 711/137
See application file for complete search history.

(56) References Cited

U.S. PATENT DOCUMENTS

| | | | | |
|---|---|---|---|---|
| 5,347,642 A | * | 9/1994 | Barratt | 711/113 |
| 2004/0003178 A1 | * | 1/2004 | Magoshi | 711/137 |
| 2007/0288697 A1 | * | 12/2007 | Keltcher | 711/137 |

* cited by examiner

*Primary Examiner* — Sanjiv Shah
*Assistant Examiner* — Daniel Tsui

(57) ABSTRACT

A first address is received and is used to determine a first address range. The first address range includes a second address range and a third address range. If the first address is in the second address range, a fourth address range is determined. The fourth address range is different from the first address range. Information is retrieved from a memory in response to determining that a second address is in the first address range or the fourth address range. If the first address is in the third address range, a fifth address range is determined. The fifth address range is different from the first address range. Other information is retrieved from the memory in response to determining the second address is in the first address range or the fifth address range.

20 Claims, 3 Drawing Sheets

HYBRID REGION CAM FOR REGION PREFETCHER AND METHODS THEREOF

CROSS-REFERENCE TO RELATED APPLICATION(S) BACKGROUND

1. Field of the Disclosure

The present disclosure relates generally to electronic devices, and more particularly to data processing devices.

2. Description of the Related Art

Data processing devices such as microprocessors frequently operate at a considerably higher speed than associated external memory devices that store data. Speculatively accessing data from the external memory before the data is needed is referred to as prefetching. Prefetching data can improve the computational performance of a data processing device. The data processing device prefetches data from the external memory and stores the data at one or more data cache memories, which operate at greater speed than the external memory. Prefetching of data typically is based on heuristic information identified during previous memory requests. The data processing device can include a prefetch module, which uses the heuristic information to speculatively prefetch data that the prefetch module has determined has a greater chance of being subsequently required.

The locations in the external memory where particular data is stored can depend on how the data is stored in a data structure such as a hash table. One type of data prefetching is stride prefetching. A pattern of sequential or quasi-sequential data accesses is observed, and data is prefetched in a manner consistent with the observed stride pattern. Another type of data prefetching is region prefetching. Region prefetching is based on previous patterns of memory accesses that indicate which regions in memory are being accessed more frequently. The prefetch module analyzes the previous patterns in order to predict future behavior. Such analysis can require that a significant number of mathematical operations be performed in parallel, increasing product cost.

BRIEF DESCRIPTION OF THE DRAWINGS

The present disclosure may be better understood, and its numerous features and advantages made apparent to those skilled in the art by referencing the accompanying drawings.

DETAILED DESCRIPTION

A prefetch device is disclosed that includes a content addressable memory (CAM) configured to store addresses that have resulted in a cache-miss. When a cache-miss is indicated at a cache, the address that resulted in the cache-miss (referred to as the cache-miss address) is provided to the CAM. The CAM compares a region defined by the cache-miss address to the respective regions of previous miss addresses stored at the CAM. The CAM provides information to a prefetch module identifying which of the previous cache-miss addresses fall within the same region as the current cache-miss address. The prefetch module uses this information to determine whether to prefetch data for the cache. The region corresponding to a cache-miss address is determined based on where the cache-miss address is located within a fixed range of memory addresses. This allows the CAM to be implemented in a relatively small area, while allowing the region to be sufficiently flexible to provide for efficient training of the prefetch module.

Figure 1:
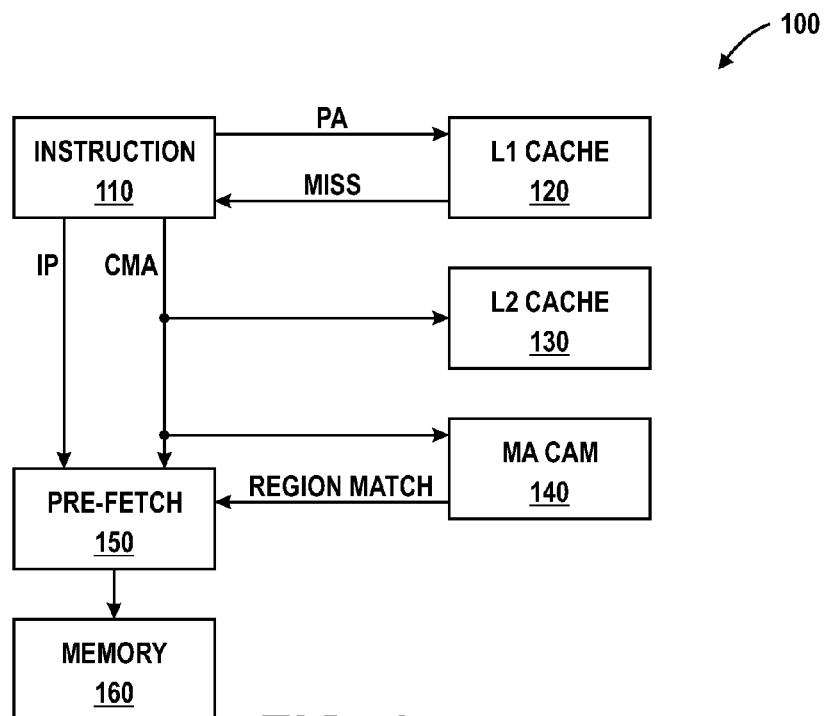
FIG. 1 is a block diagram illustrating a data processing device in accordance with a specific embodiment of the present disclosure.

FIG. 1 is a block diagram illustrating a data processing device 100 in accordance with a specific embodiment of the present disclosure. Data processing device 100 includes an instruction module 110, an L1 cache memory 120, an L2 cache memory 130, a miss address (MA) content addressable memory (CAM) 140, a pre-fetch module 150, and a memory module 160. Instruction module 110 has an output to provide a signal labeled "PA" to L1 cache memory 120, and input to receive a signal labeled "MISS" from L1 cache memory 120, an output to provide a signal labeled "IP" to pre-fetch module 150, and an output to provide a signal labeled "CMA" to L2 cache memory 130, MA CAM 140, and pre-fetch module 150. MA CAM 140 has an output to provide a signal labeled "REGION MATCH." Pre-fetch module 150 has an output connected to memory module 160.

Instruction module 110 represents a portion of an execution unit of a data processing device, and contains an instruction that is currently being executed by the data processing device. If the instruction is a data manipulation instruction, the required data must be first located and retrieved. Instruction module 110 first attempts to retrieve the required data from L1 cache 120 by providing L1 cache memory 120 with the physical address (PA) of the required data. If the required data is available at L1 cache memory 120, L1 cache memory 120 responds by providing the requested data to the execution unit for processing. If the required data is not located in L1 cache memory 120, L1 cache memory 120 responds by asserting the signal MISS. Instruction module 110 then forwards the same physical address, now referred to as a cache-miss address (CMA), to L2 cache memory 130 to determine if the required data is present at L2 cache memory 130. The CMA is also provided to MA CAM 140 and pre-fetch module 150.

MA CAM 140 is a first-in first-out (FIFO) module that stores information related to the most recent sixty-four cache-miss addresses. Each CMA entry represented at MA CAM 140 is an address associated with a region of physical memory that includes the CMA, and specifically a hybrid region as disclosed herein. For example, if instruction module 110 requires data from an address, and the data is not available at L1 cache memory 120, an attempt to retrieve the required data from L2 cache memory 130 is initiated. Simultaneously, the CMA is provided to MA CAM 140 where it is compared with previous CMAs and stored. If MA CAM 140 already contains sixty-four entries, then the least recently added CMA entry is deleted to make room for the new entry. MA CAM 140 can be included as part of prefetch module 150. Each of the previous CMAs stored at MA CAM 140 corresponds to a different data manipulation instruction.

When a L1 cache-miss occurs, MA CAM 140 compares the memory region containing the current CMA to each of the sixty-four entries contained in MA CAM 140 to identify how many, if any, of the previous CMAs were within the same region of memory as the current CMA. The information is communicated to pre-fetch module 150 via the sixty-four bit signal REGION MATCH. Each bit of signal REGION MATCH is associated with a corresponding entry in MA CAM 140. If an entry in MA CAM 140 identifies the same region of the current CMA, the respective bit of signal REGION MATCH is asserted. For example, three bits of signal REGION MATCH are asserted if MA CAM 140 contains three entries identifying the same region as that associated with the current CMA.

Pre-fetch module 150 is configured to access memory 160 to attempt to acquire data and store the data into a cache memory before that data is needed by a subsequent data manipulation instruction. Pre-fetch module 150 uses the information provided by signal REGION MATCH, the current CMA, and an instruction pointer represented by signal IP to develop a pre-fetch strategy based on prior experience. Determining an address to speculatively access from memory 160 is known as pre-fetch training. Signal IP identifies the instruction that required the data corresponding to the current CMA. Pre-fetch module 150 may use a variety of strategies to attempt to predict data that is likely to be subsequently requested by instruction module 110. For example, if recent history suggests that data contained at sequential addresses has been processed, then a stride approach may yield preferred results, and data located at further sequential addresses can be pre-fetched. If however a stride cannot be identified, than another prediction technique, such as region prediction may be used. For example, if the addresses corresponding to a significant number of recently requested data are associated with the same region of memory, than it may be considered likely that subsequent requests for data may also correspond to that region of memory.

The specified size of a region of memory that used for pre-fetch prediction can depend on the type of data processing application that is being executed, the type of database containing the data, and many other variables. For the purpose of example, a region size of one kilobyte (1024 bytes) is described, however other region sizes can be selected. When a cache-miss occurs, MA CAM 140 identifies how many of the most recent sixty-four cache-miss addresses correspond to memory addresses bound by the memory region of the current cache-miss. For example, if the CMA were equal to a physical memory address of CMA1, then MA CAM 140 would determine how many recent cache-misses are within an address range of CMA1–512 bytes and CMA1+512 bytes.

A region of memory addresses where address CMA1 is centered within the region is referred to as a floating region. In order to determine which of the sixty-four previous CMAs, if any, are located within a region bounded by the current CMA +/−512 bytes, all sixty-four previous CMA entries would need to be compared to the current CMA 210. This could be accomplished using sixty-four arithmetic subtract modules where each subtract module is associated with a corresponding register containing a previous CMA.

Figure 2:
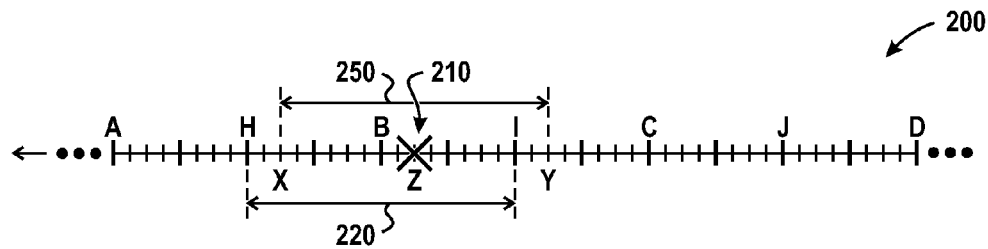
FIG. 2 is a graph illustrating a hybrid region and a floating region associated with the first CMA in accordance with a specific embodiment of the present disclosure.
Figure 3:
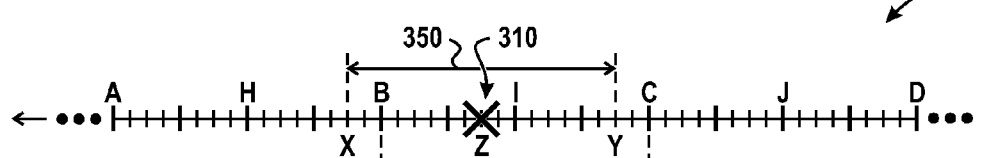
FIG. 3 is a graph illustrating a hybrid region and a floating region associated with a second CMA in accordance with a specific embodiment of the present disclosure.
Figure 4:
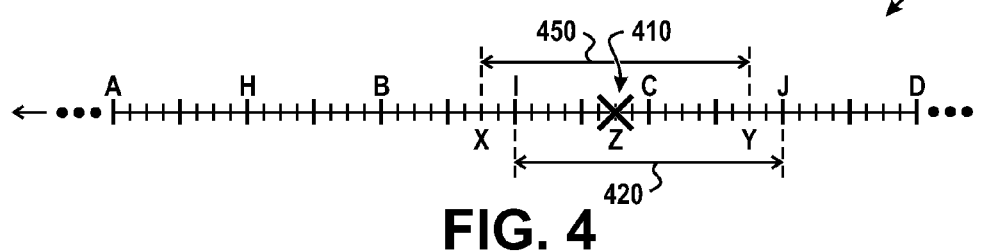
FIG. 4 is a graph illustrating a hybrid region and a floating region associated with a third CMA in accordance with a specific embodiment of the present disclosure.

A hybrid region technique is disclosed herein that allows the use of a CAM such as MA CAM 140 to be used to perform a region-match. A CAM implementation requires significantly less circuit area and consumes less power than would be required to implement region matching based on floating regions. FIGS. 2, 3, and 4 illustrate examples of a hybrid region corresponding to three CMAs, and how the hybrid region is determined by MA CAM 140.

FIG. 2 is a graph 200 illustrating a hybrid region and a floating region associated with the first CMA in accordance with a specific embodiment of the present disclosure. Graph 200 represents a portion of a physical address range, such as the address range of memory module 160, with addresses increasing to the left. Graph 200 includes addresses A, B, C, D, H, I, J, a CMA 410 at address Z, floating region 250 bounded by address X and address Y, and a hybrid region 220 bounded by address H and address I.

The physical address range is divided into one-kilobyte portions, each portion bounded by addresses A, B, C, and D. For example, the memory contains 1024 bytes of data between address A and address B, and between address B and address C. Each respective one-kilobyte range is further divided into sixteen equal sixty-four byte portions corresponding to the size of a single cache line. A cache line represents a single entry in L1 cache memory 120. CMA 210 is centered within a floating range where address X is equal to CMA 210+512 bytes, and address Y is equal to CMA 210−512 bytes. Floating region 250 and hybrid region 220 are one kilobyte in size. Addresses A, H, B, I, C, J, and D sequentially delineate contiguous 512-byte regions of physical address space.

A one-kilobyte hybrid region includes two contiguous 512-byte regions. The first of the two 512-byte regions is the range that includes the CMA. For example, CMA 210 at address Z is included in the 512-byte memory range bound by address B and address I. The second 512-byte region is selected from one of the two 512-byte regions adjacent to the first range. The 512-byte region to the left (higher addresses) is selected if the CMA is located in the upper (left) half of the first 512-byte region, and the 512-byte region to the right (lower addresses) is selected if the CMA is located in the lower (right) half of the first 512-byte region. For example, CMA 210 at address Z is located in the upper (left) half of the 512-byte region bounded by address B and address I, so the second 512-byte region is the range bounded by address H and address B. A combined hybrid region corresponding to CMA 210 is therefore the range bounded by address H and address I. The hybrid region, which is represented by the base addresses I and B, is stored in MA CAM 240 to represent the CMA hybrid region. MA CAM 140 can compare a subsequent CMA to each of up to sixty-four previous CMAs, and identify which of the previous CMAs are within the hybrid region corresponding to the current CMA.

The use of hybrid regions permits the use of a CAM to efficiently compare the current CMA to the prior CMAs instead of using a large number of subtract modules. Unlike standard computer random access memory (RAM) in which the user supplies a memory address and the RAM returns the data word stored at that address, a CAM is designed such that the user supplies a data word (key) and the CAM searches its entire memory to see if that data word is stored anywhere within the memory. If the data word is stored in the CAM, the CAM returns an indication of storage addresses where the data word is located. The hybrid region corresponding to each prior CMA is stored at MA CAM 140, and the current CMA is used as a key. Any entry in MA CAM 140 that specifies a hybrid region that includes the current CMA results in the assertion of a respective bit of output signal REGION MATCH. Therefore, a CAM can provide the desired functionality of comparing the current CMA to the hybrid regions corresponding to each of sixty-four prior CMAs. A region is represented in MA CAM 140 using the base address of the region. The base address of a region is the address of the first byte of data contained in the region.

FIG. 3 is a graph 300 illustrating a hybrid region and a floating region associated with a second CMA in accordance with a specific embodiment of the present disclosure. Graph 300 represents a portion of a physical address range, such as the address range of memory module 160, with addresses increasing to the left. Graph 300 includes addresses A, B, C, D, H, I, J, a CMA 310 at address Z, floating region 350 bounded by address X and address Y, and a hybrid region 320 bounded by address B and address C. CMA 310 at address Z is included in the first 512-byte region bound by address B and address I. CMA 310 at address Z is located in the lower (right) half of the 512-byte region bounded by address B and address I, so the second 512-byte region is the range bounded by address I and address C. A combined hybrid region corresponding to CMA 310 is therefore the range bounded by address B and address C. The hybrid region, which is represented by the base addresses C and I, is stored in MA CAM 140 to represent the CMA hybrid region.

FIG. 4 is a graph 400 illustrating a hybrid region and a floating region associated with a third CMA in accordance with a specific embodiment of the present disclosure. Graph 400 represents a portion of a physical address range, such as the address range of memory module 160, with addresses increasing to the left. Graph 400 includes addresses A, B, C, D, H, I, J, a CMA 410 at address Z, floating region 450 bounded by address X and address Y, and a hybrid region 420 bounded by address I and address J. CMA 410 at address Z is included in the 512-byte region bound by address I and address C. CMA 410 at address Z is located in the lower (right) half of the 512-byte region bounded by address I and address C, so the second 512-byte region is the range bounded by address C and address J. A combined hybrid region corresponding to CMA 410 is therefore the range bounded by address I and address J. The hybrid region, which is represented by the base addresses J and C, is stored in MA CAM 140 to represent the CMA hybrid region.

Figure 5:
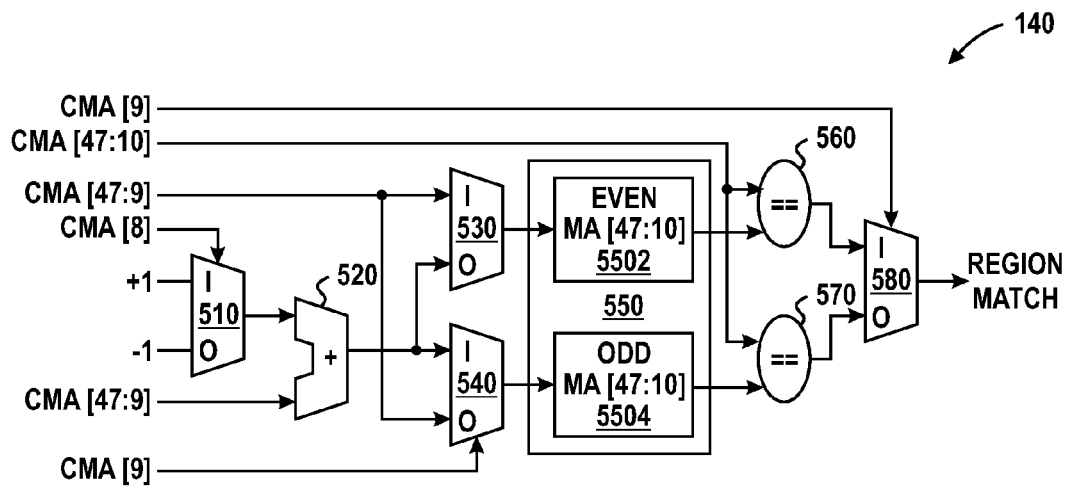
FIG. 5 is a block diagram illustrating an implementation of a miss-address content addressable memory (CAM) in accordance with a specific embodiment of the present disclosure.

FIG. 5 is a block diagram illustrating the implementation of MA CAM 140 of FIG. 1. MA CAM 140 can compare a current CMA with hybrid regions corresponding to sixty-four previous CMAs as illustrated at FIGS. 2-4 in accordance with a specific embodiment of the present disclosure. MA CAM 140 includes a multiplexors 510, 530, 540, and 580, an adder 520, CAM 550, and comparators 560 and 570. CAM 550 includes an even portion 5502 and an odd portion 5504.

Multiplexor 510 has a selection control input to receive CMA(8), a first data input to receive a signal representing a value of positive-one, a second data input to receive a signal representing a value of negative-one, and an output. Adder 520 as a first data input connected to the output of multiplexor 510, a second data input connected to CMA(47:9), and an output. Multiplexor 530 has a selection control input to receive CMA(9), a first data input to receive CMA(47:9), a second data input connected to the output of adder 520, and an output. Multiplexor 540 has a selection control input to receive CMA(9), a first data input connected to the output of adder 520, a second data input to receive CMA(47:9), and an output.

Even portion 5502 of CAM 550 has an input connected to the output of multiplexor 530, and an output. Odd portion 7504 of CAM 550 has an input connected to the output of multiplexor 540, and an output. Comparator 560 has a data input connected to CMA(47:10), another data input connected to the output of even portion 5502 of CAM 550, and an output. Comparator 570 has a data input connected to CMA (47:10), another data input connected to the output of odd portion 5504 of CAM 550, and an output. Multiplexor 580 has a selection control input connected to CMA(9), a data input connected to the output of comparator 560, another data input connected to the output of comparator 570, and an output to provide signal REGION MATCH.

MA CAM 140 is configured to compare the current CMA to hybrid regions corresponding to each of the most recent sixty-four previous CMAs, and indicate any matches by asserting a respective bit of sixty-four bit signal REGION MATCH corresponding to each match. After the comparison is complete, the hybrid region corresponding to the current CMA is stored at MA CAM 140, replacing the least recently stored entry, if any. Thus, the current CMA can be compared to subsequent CMA hybrid regions until it too is replaced after sixty-four subsequent cache-misses have occurred.

Multiplexors 510, 530, 540, and adder 520 generate a base addresses corresponding to the two portions of hybrid region associated with the current CMA. The base address of a portion of a region is the address corresponding to the first data byte of that region. CMA(47:9) represents the base address of the first 512-byte region that includes the current CMA, such as the range from address B to address I at FIG. 2. The output of adder 520 represents the base address of the second 512-byte region that is combined with the first 512-byte region to together represent a 1-kilobyte hybrid region. The output of adder 520 provides the base address of the second 512-byte region by either subtracting one from the least significant bit of CMA(47:9), or adding one to the least significant bit of CMA(47:9), depending on the value of CMA(8). For example, if CMA(8) is a one such as illustrated at FIG. 2, then the base address of the second 512-byte region is determined by adding one to CMA(47:9) to provide the base address corresponding to the immediately higher 512-byte region, from address H to address B. If CMA(8) is a zero such as illustrated at FIG. 3, then the base address of the second 512-byte region is determined by subtracting one from CMA(47:9) to provide the base address corresponding to the immediately lower 512-byte region, from address I to address C.

CAM 550 is organized to include an even portion 5502 and an odd portion 5504. Multiplexors 530 and 540 are controlled by CMA(9) and determine which portion receives the first 512-byte region and which portion receives the second 512-byte region. If CMA(9) is a one, then the base address of the first 512-byte region is stored at even portion 5502, and the base address of the second 512-byte region is stored in odd portion 5504. If CMA(9) is a zero, then the base address of the first 512-byte region is stored at odd portion 5504, and the base address of the second 512-byte region is stored in even portion 5502.

Before storing the hybrid region corresponding to the current CMA, the current CMA is compared to the hybrid regions associated with previous CMAs, if any. Up to sixty-four previous CMAs can be represented in CAM 550. Comparator 560 compares CMA(47:10) to each entry in even portion 5502 of CAM 550. Comparator 570 compares CMA (47:10) to each entry in odd portion 5504 of CAM 550. Comparators 560 and 570 each provide a sixty-four bit data value where each bit corresponds to a respective entry at CAM even portion 5502 and CAM odd portion 5504, respectively. If the address stored at an entry in CAM 550 is equal to the current CMA, the corresponding comparator output bit is asserted. For example, if the current CMA is 3C4, and the fifth and twenty-second entry in even portion 5502, and the second entry in odd portion 5504 contains the value 3C4, then the fifth and twenty-second output bits of comparator 560 will be asserted, and the second output bit of comparator 570 will be asserted.

CMA(9) configures multiplexor 580 to select between the outputs of comparators 560 and 570. If CMA(9) is a one, the output of comparator 560 is selected, and if CMA(9) is a zero, the output of comparator 570 is selected. The selected value is provided at the output of multiplexor 580 as a sixty-four bit value REGION MATCH. Comparators 560 and 570, and multiplexor 580 can be implemented as integral parts of CAM 550 using precharge-discharge logic. Referring again to the previous example, if CMA(9) is a zero, than comparator 570 is selected, and the second bit of REGION MATCH will be asserted. This indicates that only one of the previous sixty-four CMAs was within the same hybrid region as the current CMA. Pre-fetch module 150 can use this information as a basis in determining a pre-fetch strategy.

Figure 6:
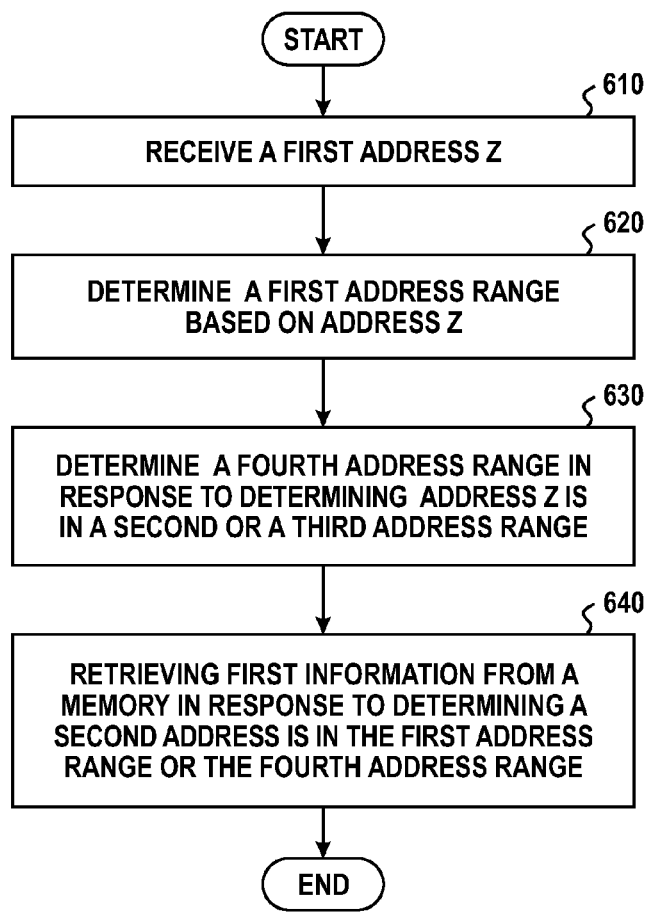
FIG. 6 is a flow diagram illustrating the operation of the miss-address CAM of FIG. 5 in accordance with a specific embodiment of the present disclosure.

FIG. 6 is a flow diagram 600 illustrating the operation of MA CAM 140 in accordance with a specific embodiment of the present disclosure. The flow begins at block 610 where a first CMA Z is received from instruction module 110. Address Z can represent CMA 210 at FIG. 2. The flow proceeds to block 620 where a first address range is determined based on address Z. CMA 210 is included within the range bounded by addresses B and I, so this range is the first address range included in the hybrid region associated with CMA 210. The flow proceeds to block 630 where a fourth address range is determined in response to determining whether address Z is in a second or a third address range, where the second and third address range correspond to the lower and upper half of the first address range. CMA 210 is included in the upper half of the first address range, so the fourth address range included in the hybrid region associated with CMA 210 is the range bounded by address H and B at FIG. 2. The combination of the first and fourth address range, bounded by addresses H and I, corresponds to a hybrid region associated with CMA 210.

The flow proceeds to block 640 where first information from a memory is retrieved in response to determining that a second CMA is in the hybrid region of the first CMA. Because the second CMA is located within the hybrid region of a previous CMA, pre-fetch module 150 has determined that particular data values in memory 160 are likely to be needed by subsequent data manipulation instructions, and so these data values are speculatively accessed from memory 160. If address Z was located within a second address range corresponding to the lower half of the first address range, such as CMA 310 at FIG. 3, then the first address range is still the range bounded by addresses B and I, but the fourth address range is now the range bounded by addresses I and C. The combination of the first and fourth range, bounded by addresses B and C, corresponds to a hybrid region associated with CMA 310.

Figure 7:
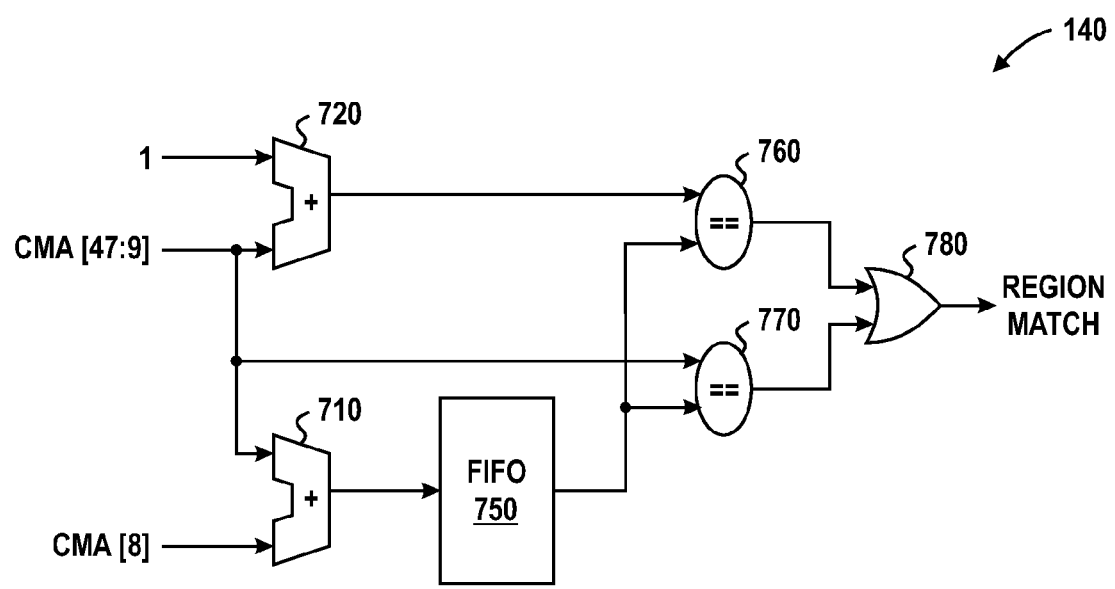
FIG. 7 is a block diagram illustrating another implementation of a miss-address CAM in accordance with a specific embodiment of the present disclosure.

FIG. 7 is a block diagram illustrating another implementation of MA CAM 140 in accordance with a specific embodiment of the present disclosure. MA CAM 140 includes adders 710 and 720, a FIFO 750, comparators 760 and 770, and an OR gate 780. Adder 710 has an input to receive CMA(47:9), an input to receive CMA(9), and an output. Adder 720 has an input to receive a signal with a value of one, an input to receive signal CMA(47:9), and an output. FIFO 750 has an input connected to the output of adder 710, and an output. Comparator 760 has an input connected to the output of adder 720, an input connected to the output of FIFO 750, and an output. Comparator 770 has an input to receive signal CMA(47:9), an input connected to the output of FIFO 750, and an output. OR gate 780 has an input connected to the output of comparator 760, an input connected to the output of comparator 770, and an output to provide signal REGION MATCH.

MA CAM 140 is configured to compare the current CMA to hybrid regions corresponding to each of the most recent sixty-four previous CMAs, and indicate any matches by asserting a respective bit of sixty-four bit signal REGION MATCH corresponding to each match. After the comparison is complete, the hybrid region corresponding to the current CMA is stored at MA CAM 140, replacing the least recently stored entry, if any. Thus, the current CMA can be compared to subsequent CMA hybrid regions until it too is replaced after sixty-four subsequent cache-misses have occurred.

If a data manipulation instruction not currently represented in MA CAM 140 results in a cache-miss, a particular address representing the current CMA is stored at FIFO 750. If the current CMA is located in the lower half of a 512-byte region, than the base address corresponding to this 512-byte region is stored at FIFO 750. If the current CMA is located in the upper half of a 512-byte region, than the base address corresponding to this 512-byte region is incremented and the resulting address is stored at FIFO 750. For example, if the current CMA corresponds to address Z at FIG. 2, the current CMA is incremented and the base address corresponding to the range bounded by addresses H and B is stored at FIFO 750. If the current CMA corresponds to address Z at FIG. 3, the base address corresponding to the range bounded by addresses B and I is stored at FIFO 750.

Comparator 770 compares the base address of the 512-byte range containing the current CMA to each of the sixty-four entries at FIFO 750. Comparator 760 compares the base address of the 512-byte range containing the current CMA that is incremented by one to each of the sixty-four entries at FIFO 750. A corresponding bit of sixty-four bit signal REGION MATCH is asserted for each respective entry at FIFO 750 for which the output of either of comparators 760 or 770 are asserted. If the current CMA is located in the upper half of a 512-byte region, the output of comparator 760 will be asserted if a previous CMA was also in the upper half of the same 512-byte region and comparator 770 will not be asserted. If the current CMA is located in the lower half of a 512-byte region, the output of comparators 760 will be asserted if a previous CMA was also in the lower half of the same 512-byte region.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:
1. A method, comprising:
receiving a first address;
determining a first address range based on the first address, the first address range including a second address range sequentially contiguous with a third address range, wherein the first, second, and third address ranges are a linear sequence of contiguous addresses;

in response to determining the first address is in the second address range:
    determining a fourth address range, addresses of the fourth address range different from and sequentially contiguous with addresses of the first address range; and
    retrieving first information from a memory in response to determining a second address is in the first address range or the fourth address range; and
in response to determining the first address is in the third address range:
    determining a fifth address range in response to determining the first address is in the third address range, addresses of the fifth address range different from and sequentially contiguous with addresses of the first address range; and
    retrieving second information from a memory in response to determining the second address is in the first address range or the fifth address range.

2. The method of claim 1, wherein the second address range and the third address range are non-overlapping address ranges.

3. The method of claim 1, wherein determining the first address range comprises masking a first portion of the first address.

4. The method of claim 1, wherein retrieving the first information comprises:
    modifying a prefetch value in response to determining the second address is in the first address range or the second address range; and
    retrieving the first information based on the prefetch value.

5. The method of claim 1, further comprising:
    determining a sixth address range based on the second address;
    determining a seventh address range in response to determining the second address is in a first portion of the sixth address range; and
    retrieving third information from the memory in response to determining a third address is in the sixth address range or the seventh address range.

6. The method of claim 1, wherein receiving the first address comprises receiving the first address in response to an indication of a miss at a cache memory, the miss based on the first address.

7. The method of claim 1, further comprising storing a representation of the first address range and of the fourth address range at a content addressable memory, the representations of the first address range and the fourth address range each including a base address of the corresponding address range.

8. The method of claim 1, further comprising storing a representation of the first address range and of the fifth address range at a content addressable memory, the representations of the first address range and the fifth address range each including a base address of the corresponding address range.

9. A method, comprising:
    in response to determining information associated with a first address is not stored at a first memory, storing a representation of the first address at a content addressable memory, the representation including a base address of a range of addresses that includes the first address, wherein the range of addresses is a linear sequence of contiguous addresses:
    in response to receiving a second address:
        determining a first address range based on the first address, the first address range including a second address range sequentially contiguous with a third address range;
    in response to determining the first address is in the second address range and is not in the third address range:
        determining a fourth address range based on the first address, addresses of the fourth address range sequentially contiguous with addresses of the first address range; and
        indicating a hit at the content addressable memory in response to determining the second address is in the first or the fourth address ranges.

10. The method of claim 9, further comprising:
    in response to receiving the second address:
        in response to determining the first address is in the third address range and is not in the second address range:
            determining a fifth address range based on the first address; and
            indicating a hit at the content addressable memory in response to determining the second address is in the first or the fifth address ranges.

11. The method of claim 10, further comprising:
    in response to indicating a hit at the content addressable memory:
        retrieving information associated with the first address and information associated with the second address from a second memory.

12. The method of claim 9, further comprising:
    in response to determining information associated with the second address is not stored at the first memory:
        storing a fifth address range based on the second address; and
        storing a sixth address range based on the second address in response to determining the second address is in a first portion of the fifth address range.

13. The method of claim 9, wherein the second address range is approximately half the first address range.

14. The method of claim 9, wherein storing the representation of the first address comprises storing a base address of the first address range.

15. The method of claim 9, wherein the second address range is of a different size than the first address range.

16. The method of claim 15, wherein the second address range is approximately half a size of the first address range.

17. A device, comprising:
    a memory comprising an input to receive a first address and an output to provide a first miss indication in response to the memory determining information associated with the first address is not stored at the memory; and
    a content addressable memory comprising:
        an input coupled to the output of the memory;
        a memory module configured to store a representation of a second address, the representation including a base address of a range of addresses that includes the second address;
        an output; and
        a comparison module configured to, in response to the first miss indication:
            determining a first address range based on the second address, the first address range including a second address range sequentially contiguous with a third address range, wherein the first and second address ranges are a linear sequence of contiguous addresses;

in response to determining the second address is in the second address range and is not in the third address range:
    determining a fourth address range based on the second address, addresses of the fourth address range sequentially contiguous with addresses of the first address range; and
    indicate hit information at the output in response to determining the first address is in the first or the fourth address ranges.

18. The device of claim 17, further comprising:
a prefetch module comprising an input coupled to the output of the content addressable memory and an output to provide prefetch information based on the hit information.

19. The device of claim 17, further comprising:
a memory coupled to the output of the prefetch module, the memory configured to retrieve stored information based on the prefetch information.

20. The device of claim 17, wherein the comparison module is configured to:
    in response to determining the second address is in the third address range and is not in the second address range:
        determining a fifth address range based on the second address, the fifth address range sequentially contiguous with the first address range; and
        indicate a hit at the content addressable memory in response to determining the first address is in the first or the fifth address ranges.

* * * * *